(12) United States Patent
Reimers et al.

(10) Patent No.: US 7,279,099 B2
(45) Date of Patent: Oct. 9, 2007

(54) SLUDGE TREATMENT PROCESS

(75) Inventors: Robert S. Reimers, Metairie, LA (US);
Frederick P. Mussari, Melbourne, FL (US);
Wilfried Schmitz, Jacksonville, FL (US)

(73) Assignee: FKOS, LLC, St. Augustine, FL (US)

( * ) Notice: Subject to any disclaimer, the term of this patent is extended or adjusted under 35 U.S.C. 154(b) by 48 days.

(21) Appl. No.: 11/141,273

(22) Filed: Jun. 1, 2005

(65) Prior Publication Data
US 2005/0279706 A1    Dec. 22, 2005

Related U.S. Application Data

(60) Provisional application No. 60/575,360, filed on Jun. 1, 2004.

(51) Int. Cl.
*C02F 33/00*    (2006.01)

(52) U.S. Cl. .................. 210/601; 210/620; 210/631; 210/754; 210/755; 210/780; 210/756; 210/764

(58) Field of Classification Search ........ 210/754–756, 210/764, 601, 620, 631
See application file for complete search history.

(56) References Cited

U.S. PATENT DOCUMENTS

| | | | | |
|---|---|---|---|---|
| 5,281,341 A | * | 1/1994 | Reimers et al. | 210/760 |
| 2004/0180015 A1 | * | 9/2004 | Kross et al. | 424/70.1 |

* cited by examiner

*Primary Examiner*—Chester T. Barry
(74) *Attorney, Agent, or Firm*—Morrison & Foerster LLP

(57) ABSTRACT

A method utilizing chlorine dioxide and nitrous acid or other non-charged chemical species for the treatment of biosolids to destroy pathogens is provided. The method uses chlorine dioxide to modulate the ORP of the matrix, acidification of the sludge (biosolids) to a pH of less than 4.0, and provides for the addition of nitrous acid for enhanced disinfection in a closed system to prevent volitalization.

17 Claims, 7 Drawing Sheets

SLUDGE TREATMENT PROCESS

CROSS-REFERENCE TO RELATED APPLICATIONS

This application claims the priority of U.S. Provisional Application Ser. No. 60/575,360, filed Jun. 1, 2004. This application is incorporated by reference herein in their entirety.

FIELD OF THE INVENTION

The present invention relates to municipal or agricultural wastewater treatment and more particularly relates to an improved method of biosolids treatment wherein pathogen reduction and stabilization is accomplished by utilizing a combination of chlorine dioxide and non-charged chemical species known to penetrate helminth eggs (*Ascaris*).

BACKGROUND OF THE INVENTION

In the treatment of wastewater, a sludge product is generated. As the resulting biosolids contain nutrient value as a soil amendment, and are disposed of by land application, there is a need to both reduce the number of pathogens in the solid, and to reduce its attraction of vectors (birds, flies, animals) that could transport pathogens to other locations. This problem of pathogen reduction has been the subject of numerous articles.

U.S. Pat. No. 5,281,341, entitled "Sludge Treatment Process" describes a method of treating a liquid waste or process stream that includes a sludge component and that enhances sludge treatment or stabilization. The sludge is acidified to a pH of less than 4.0 in an oxygen enriched environment. A nitrous acid level is maintained sufficiently high to kill pathogens, in a closed chamber so that the nitrous acid won't be lost from the chamber through volatilization. U.S. Pat. No. 5,281,341 is incorporated herein by reference.

U.S. Pat. No. 4,936,983, entitled "Sewage Sludge Treatment With Gas Injection," relates to an apparatus for treating sewage sludge in a hyperbaric vessel in which the sludge is oxygenated by injecting an oxygen-rich gas into the sewage sludge and then dispersing the mixture of sludge and oxygen-rich gas into the upper portion of a hyperbaric vessel for further interaction with an oxygen-rich atmosphere. The oxygen-rich gas is injected into the sewage sludge by delivering the gas to a combination gas and sludge mixing and dispersing assembly. This patent teaches a process to stabilize municipal sludge by acidifying the sludge to a pH of between 2.5 and 3.5 in the presence of 200 to 300 ppm (parts per million) of oxygen at a pressure of 60 psi and a pure oxygen stream containing 3.0% to 6.0% ozone for a period of 30–90 minutes. The process was ineffective against viruses and *Ascaris* eggs. These data indicate PSRP and PFRP inactivation criteria being met for bacteria only. U.S. Pat. No. 4,936,983 is hereby incorporated herein by reference in its entirety.

The problem of disinfection and stabilization of municipal and agricultural wastes is global. The present invention teaches a method that offers significant performance and economic advantages over known methods to make the treatment of this material practical for both municipalities and agricultural operations.

SUMMARY OF THE INVENTION

The present invention provides an improved method of treating liquid waste or process streams that include a sludge component and that enhance sludge disinfection and stabilization.

Chlorine dioxide is known to be a strong oxidant and a potent biocide. In testing for disinfection of biosolids, it was discovered that while capable of inactivating bacteria and viruses, chlorine dioxide alone is not able to inactivate *Ascaris* eggs at concentrations as high as 1000 ppm.

It is known that non-charged chemical species are capable of penetrating the shell of *ascaris* eggs under certain conditions U.S. Pat. No. 5,281,341 teaches that Nitrous acid is capable of *Ascaris* inactivation in biosolids at concentrations above 400 mg/L in a closed system.

The non-ionic, or non-charged, species of a chemical in a waste stream can be maintained by controlling the pH and/or ORP of the mixture. U.S. Pat. No. 4,936,983 teaches the use of Ozone for ORP control, and uses nitrous acid as the penetrant for *Ascaris* inactivation.

It has been unexpectedly found that Chlorine dioxide has a number of unexpected advantages over ozone for this purpose. While ozone is a more powerful oxidant than chlorine dioxide, chlorine dioxide is a more specific oxidant and is able to raise and maintain the ORP of a sludge sample for a long enough period of time to allow inactivation of bacteria, viruses, and *Ascaris* eggs.

In one embodiment, the invention relates to the use of chlorine dioxide to control ORP in sludge, thus increasing the performance of disinfection due to non-charged chemical species, as well as through the performance of the chlorine dioxide itself as a disinfectant. The chlorine dioxide has an added benefit of enhancing the stability of the end product.

BRIEF DESCRIPTION OF THE DRAWING FIGURES

DETAILED DESCRIPTION OF THE INVENTION

Figure 1:
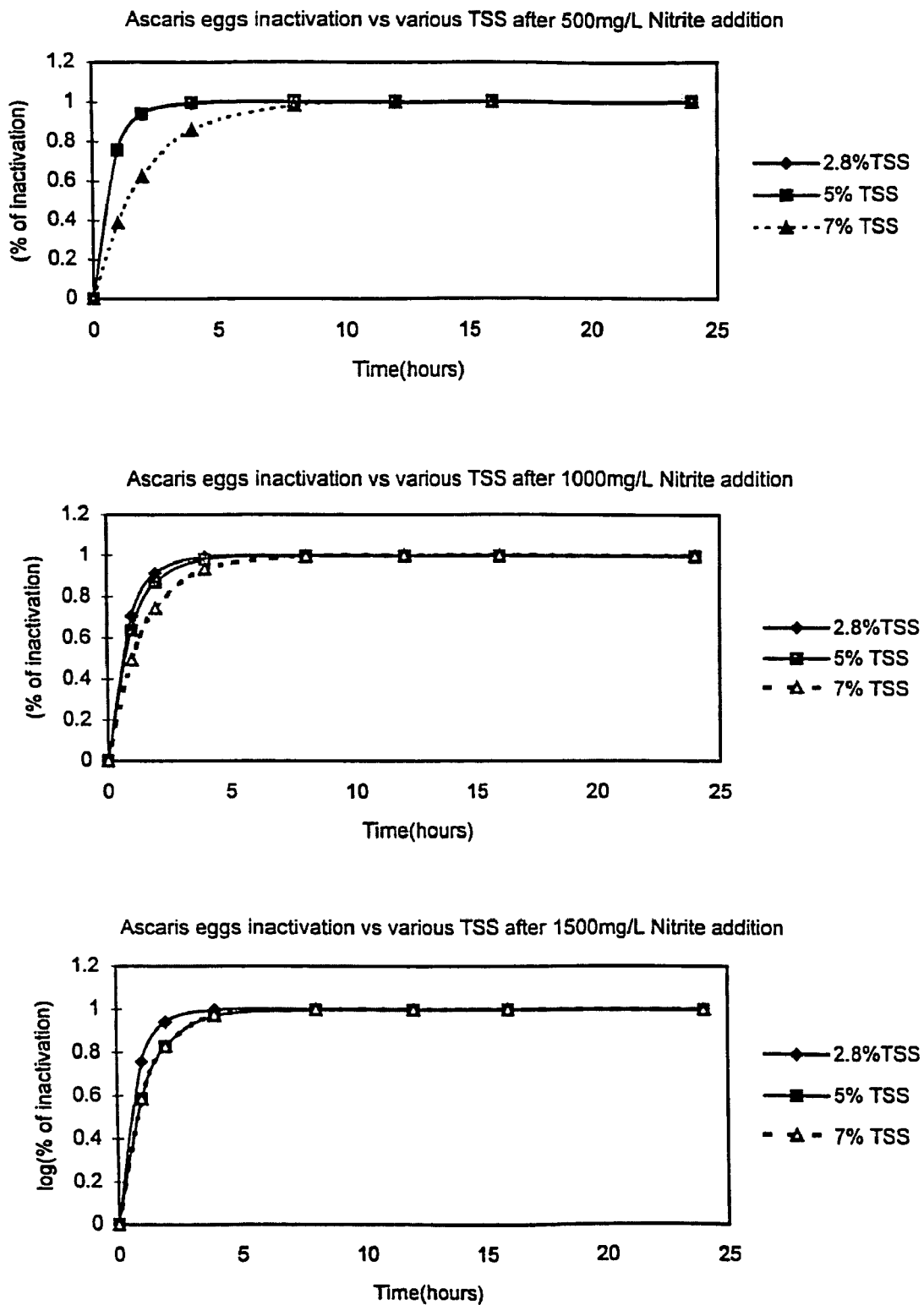
FIG. 1 shows an illustration of *Ascaris* eggs inactivation at various tss and initial nitrous acid doses.

The subject invention is directed to novel methods for treating and/or disinfecting biosolids; and particularly agricultural or municipal biosolids. In one embodiment, the methods utilize chlorine dioxide and a non-charged chemical species to disinfect and stabilize biosolids. Stabilized sludge, in general, refers to sludge that has a reduced capacity to generate odors and to undergo continued degradation, as well as sludge that has a reduced attractiveness to vectors (any living organism capable of transmitting pathogens mechanically or biologically) as demonstrated by volatile solids reduction, or other acceptable methods.

One embodiment of the subject invention is directed to the addition of an acid, for example sodium bisulfate, to lower the pH of the sludge to a specific point at which the non-charged chemical species predominates, i.e., predominates over the charged chemical species.

In a preferred embodiment, the addition of the acid is carried out in a closed vessel (tank or pipe) so that the gas emitted remains in the system for the purpose of disinfection. The vessel must be capable of withstanding the pressure generated by the volatilization of gassed when the sludge is acidified. In a preferred embodiment of the invention, the vessel must be able to withstand up to at least 15 psig. The chorine dioxide is added by injecting either pre-generated chlorine dioxide into the matrix. Sufficient contact time is provided to allow for the destruction of pathogens.

In a preferred method, the pH of the disinfected, stabilized biosolids can be adjusted after treatment to a range more suitable for disposal.

In a preferred embodiment, the ORP of the treatment stream is monitored in real time to determine the dosing of $ClO_2$ required to maintain the proper levels.

In a preferred method, the resulting non-charged chemical species is nitrous acid, although ammonia, hydrogen sulfide, or other non-charged chemical species may also be used.

In a preferred method, the sludge is acidified to a pH of between 2.5 and 3.5. The nitrous acid level should be greater than 400 parts per million, and the pathogen kill is in about 2–12 hours. The ORP of the sludge is maintained at +200–+600 mV. In a preferred method, the solids level of the waste stream is less than 7% suspended solids. Further, the nitrous acid level is in excess of 1500 milligrams per liter and the pathogen kill is in 4 hours or less.

The disclosed embodiment of the present process may produce a Class A disinfected/stabilized biosolids within 4 hours. This process produces a disinfected/stabilized-thickened biosolid that yields a Class A biosolids product. The process uses a low pH (between 2 to 3, for example) utilizing a sodium nitrite/sodium bisulfate to both disinfect and stabilize. The controlling element of the process is based around the oxidizing potential of nitrite ($NO_2^-$). In an acidic environment; this oxidizing reaction is applied to the residual biosolids fed through the process. The acidic conditions are achieved by dosing sodium bisulfate solution into the liquid biosolids while simultaneously dosing nitrites in the form of sodium nitrite solution. The ORP is controlled utilizing chlorinated mixed oxidants (chlorite-hypochlorite/chlorine dioxide). These are then mixed together for approximately 30 to 120 minutes in a batch reactor vessel where pathogenic organisms are inactivated.

In the early 1990's, Tulane conducted major laboratory and field studies that yielded a potent and a viable nitrous acid disinfection process. In the WEF Manual of Practice FD-9 entitled, "Wastewater Residuals Stabilization."

The Tulane process is capable of disinfecting raw or semi-stabilized biosolids. The process is generally more economical with thickened biosolids, but there is an increased required dosage of nitrous acid as the solids increase. The thickened biosolids is then ozonated so that the ORP is between +400 to 500 millvolts and the pH should be between 2.5 to 3.0. The ozonation/acidification step will require around 30 minutes. Nitrite is added to a level of greater than 1200 mg/l as nitrous acid and this level is held for greater than 2 hours. This exposure time is required to ensure inactivation of viruses and helminth eggs. After disinfecting currently the biosolids is stabilized by one of three methods: Mesophilic composting, Alkaline stabilization, and Head drying to pellets (solids content>90%).

Recent studies at Tulane developed two predictive models for determining the concentration of nitrous acid required to inactivate Ascaris eggs as a function of time in hours, suspended solids concentration and initial dose of nitrous acid as long as the acid is thermodynamically stable (i.e. ORP in rage of 300 to 500 mv). The nitrous acid's pKa is 3.35 and therefore, the pH must be in a rage of 2.5 to 3.0 to have nitrous acid predominate. The following two formulas were obtained from studies at Tulane.

Nitrous Acid Remaining=−250−6.735(T)+68.54(%TSS)+0.6 Initial Concentration
(in mg/l as $HNO_2$) (in mg/l as $HNO_2$)
1. Nitrous Acid=37.16(Time in hours to reach PFRP)$^-$0.5463
2. Remaining
3. (in mg/l)

From these two equations, the required time for the inactivation of parasites can be ascertained. Obviously, there is some decay of nitrous acid over time due to its instability in water. FIG. 1 through 7 elucidates these phenomena.

ORP Control

Ozone was mixed with sludge in recirculation pumps in the acid-oxygen-ozone step to increase and stabilize the ORP to the 450–520 mv range. Tests at the University of North Carolina, Chapel Hill point out that microbial density can be reduced successfully by ozone treatment alone. Fecal coliform was reduced to a non-detectable level and the inactivation of poliovirus was at least 90% when the sludge was introduced by ozone at 20–30 mg/L at pH 3.0 for at least two hours. However, the inactivation of C. perfringens spores (i.e. Ascaris eggs) was not effective when only ozone was used in this process. In another embodiment of the invention, the ORP is controlled by chlorite, chlorine dioxide and hypochlorous acid in a similar fashion.

Nitrous Acid Treatment

Ascaris ova were highly resistant to the acidification-oxygeneration-ozonation stabilization process, but they were subsequently inactivated with nitrite addition to the sludge. Sodium nitrite was used as the nitrite source.

Open System

The inactivation/dose addition curves were generated by the use of a curve fitting program. According to these exponential curves, higher doses seemed to lead to better inactivation. Higher doses of sodium nitrite were required for sludges with higher TSS concentrations. At different sodium nitrite doses, the inactivation rates at each TSS level varied only slightly. (FIG. 1) The regression coefficient ($r^2$) for the fitted curves ranged from 0.91 to 0.99, which indicates that the exponential equations developed explain 91–99% of the variability in the experimental data.

Under the same TSS concentration, the remaining nitrous acid concentration increased with increased sodium nitrite addition. In the first 4 hours, the concentration showed a sharp drop followed by a slow decrease in concentration for the next 18 hours. The results indicate that nitrite may be rapidly oxidized or volatilized in the first few hours during the rapid mixing phase. Regression analysis of initial nitrite concentration, remaining nitrite concentration, and time showed no significant interaction between time and remaining nitrous acid level at the 0.05 level of significance. This result was obtained by the Analysis of Variance for repeated measures (2V) technique using Biomedical Data Processor (BMDP) computer software.

Next, the relationship between TSS and remaining nitrous acid in the sludge was considered. Data from the laboratory report showed that a sodium nitrite dose of 500 mg/L was reduced to 150–250 mg/L after 24 hours. An initial dose of either 1000 or 1500 mg/L sodium nitrite led to the same remaining sodium nitrite level of 350–450 mg/L after 24 hours. This suggests that there is a limited remaining concentration of sodium nitrite in the sludge of about 350–450 mg/L after 24 hours, with any higher levels introduced volatilized in the open system.

At the 500 mg/L level (FIG. 2) of initial nitrite addition, a statistically significant relationship was shown between the TSS level and remaining nitrous acid. The sludge with 2.8% TSS had a remaining nitrous acid level of approximately 200 mg/L after a retention time of 12 hours. Both the 5% TSS sludge and the 7% TSS sludge had remaining nitrous acid levels of approximately 300 mg/L after the 12 hour retention time. With nitrite addition of either 1000 or 1500 mg/L (FIGS. 3 & 4), no significant relationship was observed between TSS and remaining nitrous acid at the p<0.05 level of significance. Similar results were observed in field studies.[2]

Closed System

Sludge with two different TSS levels (3.02 and 5.54% TSS) was tested to look at the effect of TSS on disinfection to the PFRP criteria. Sludge with 3.02% TSS reached the PFRP within two hours with an initial $NO_2^-$ dosage level as shown in Table 1. Time, TSS and initial dose all had a significant effect on remaining nitrous acid concentration at the p<0.05 significance level.

| TSS Level (%) | Initial $NO_2$ Dose (mg/L) | Time to PFRP (hour) | Average [$NO_2$] Remaining (mg/L) |
|---|---|---|---|
| 3.02 | 697 | 12 | 340 |
| 3.02 | 1046 | 2 | 490 |
| 5.54 | 1754 | 2 | 1150 |
| 5.54 | 2573 | 2 | 1580 |

Figure 5:
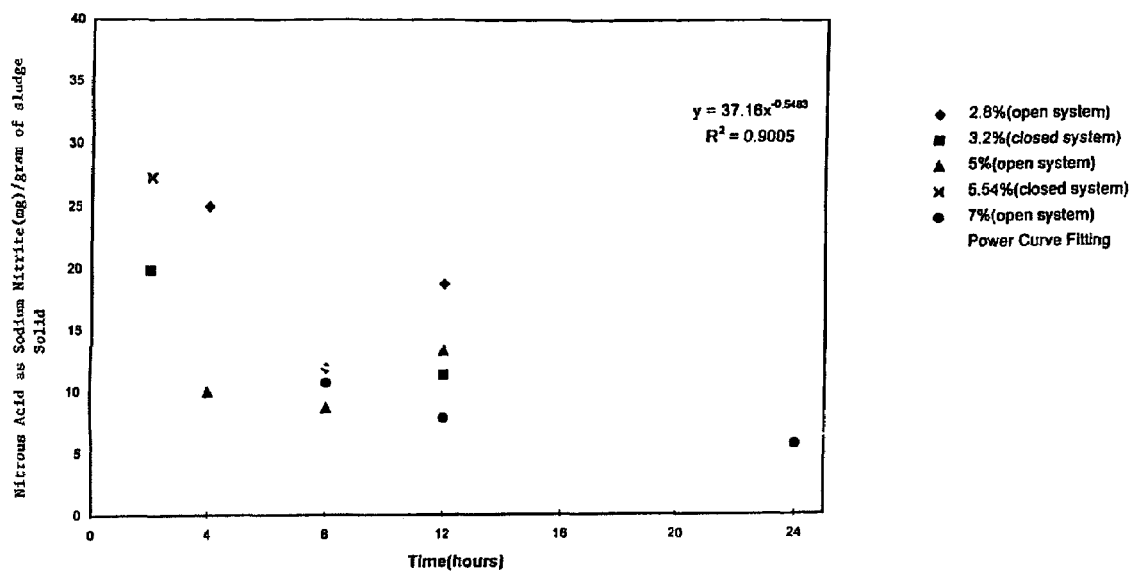
FIG. 5 illustrates data showing a power curve fit of remaining nitrous acid vs time required to reach PFRP.
Figure 6:
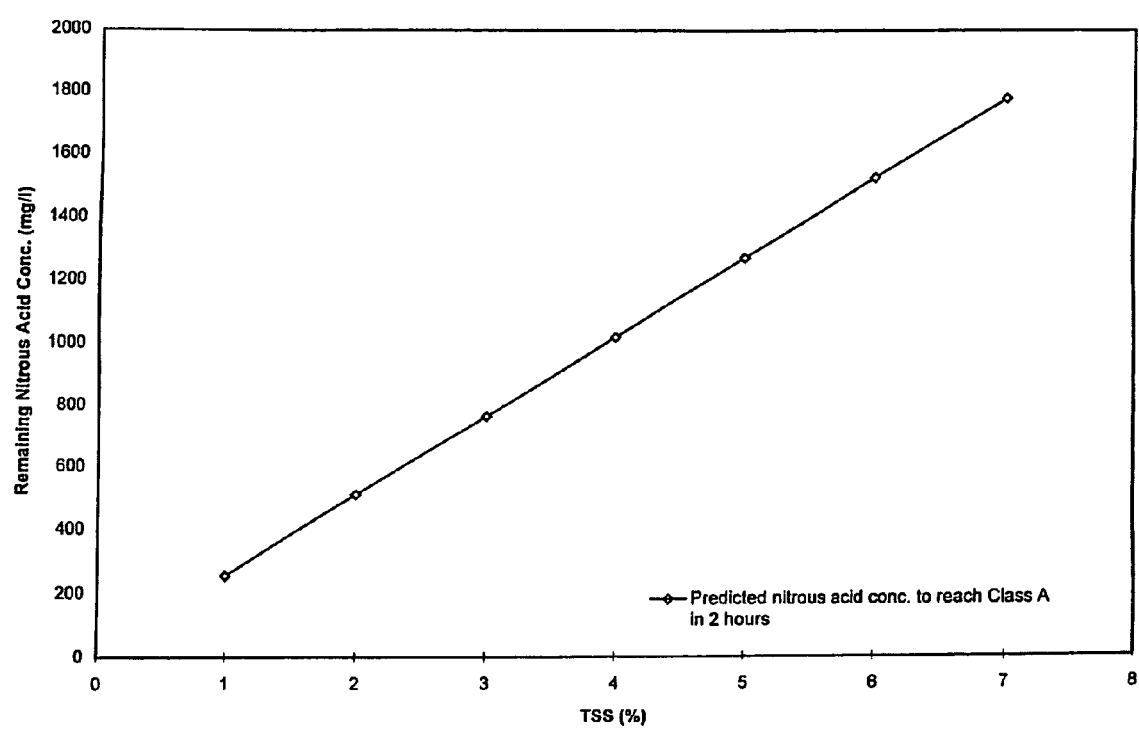
FIG. 6 shows a prediction of nitrous acid remaining to reach PFRP in 2 hours.
Figure 7:
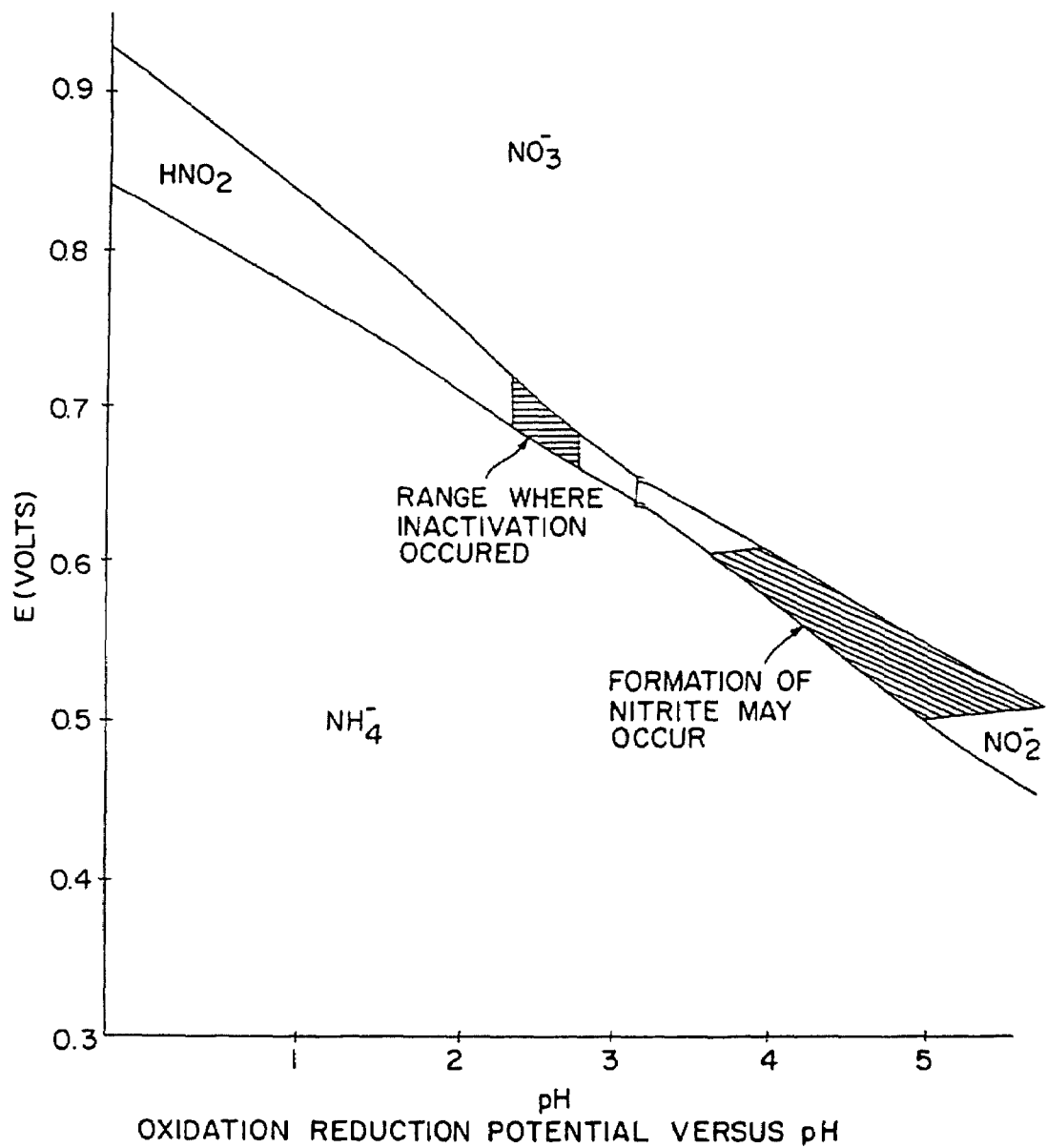
FIG. 7 is an illustration of a plot of ORP verse pH indicating regions where pathogens are inactivated.

The data of remaining nitrous acid required to reach PFRP criteria at different TSS levels was used to develop a predictive model Equation 2 using the data from experiments with both open an closed systems (FIG. 5). In order to compare the $HNO_2$ dosage levels for sludges with different TSS levels, the units were converted from mg/L to mg/g. The remaining dose required, calculated from Equation 2 was incorporated into Equation 1 to determine the initial $NO_2^-$ dose required to reach PFRP criteria at any detention time or TSS level. Using Equation 2, it is predicted that the PFRP can be reached in two hours when the remaining $HNO_2$ dose is at least 25.46 mg/g (Table 2). That happened with an initial dose of 1307 mg/L to 2532.58 mg/L and the remaining nitrous acid dose will be 764 mg/L to 1782.7 mg/L for TSS levels of 3%–7% (Table 3) (FIG. 6).

ORP Data

In the laboratory study, the ORP-pH range of inactivation *Ascaris* eggs was at pH range 2.7–3.0 and ORP range 0.480–0.590 mv. In the field study, it was observed that, when the pH was below 3 and ORP was in the range of 490–450 mv and, if ORP is greater than +520 mv, the inactivation of pathogens didn't occur (FIG. 7) because the nitrous acid is thermodynamically instable.

ORP and pH

Figure 2:
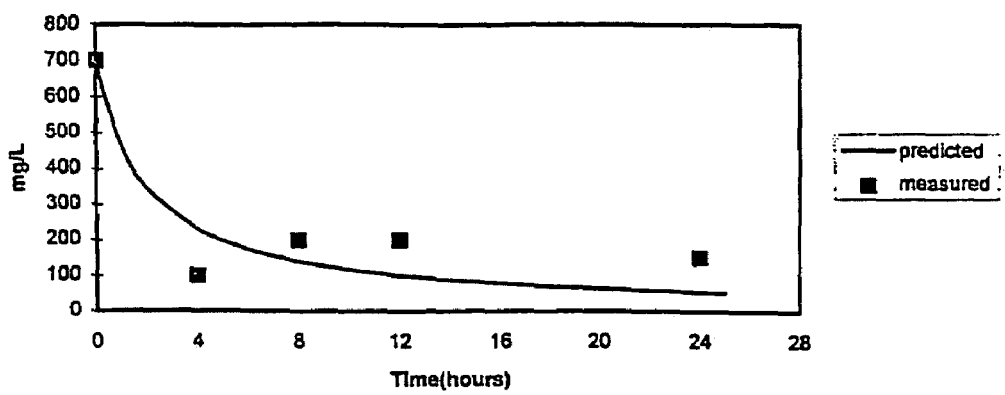
FIG. 2 is a graphical illustration of nitrous acid remaining for different tss at 500 mg/l nitrite addition.
Figure 2:
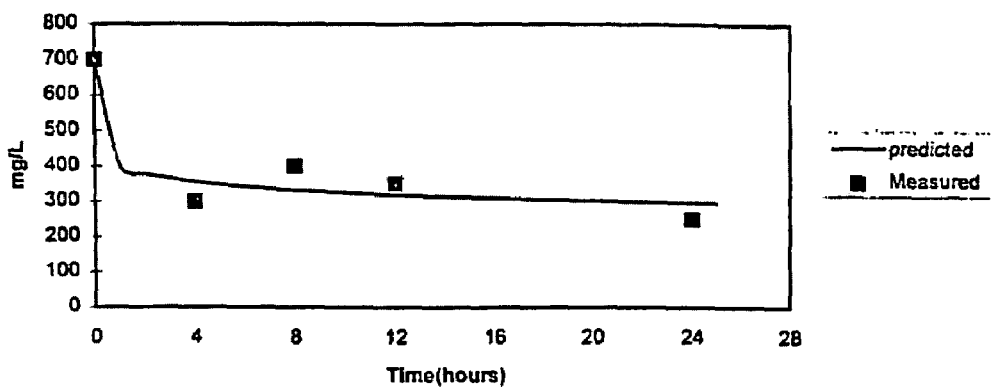
Figure 2:
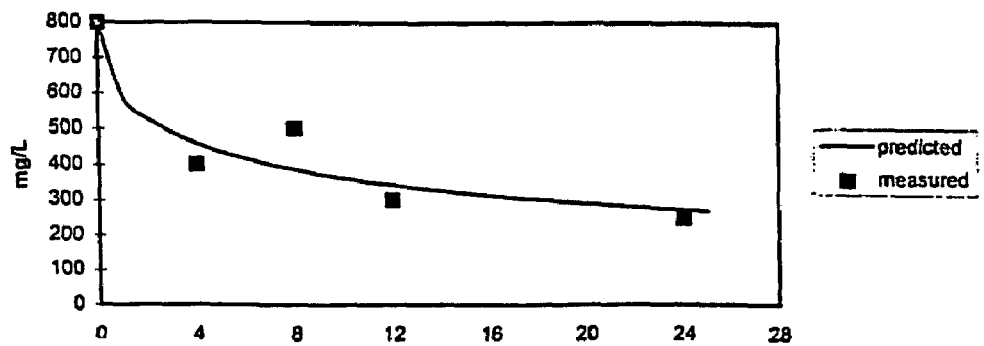
Figure 3:
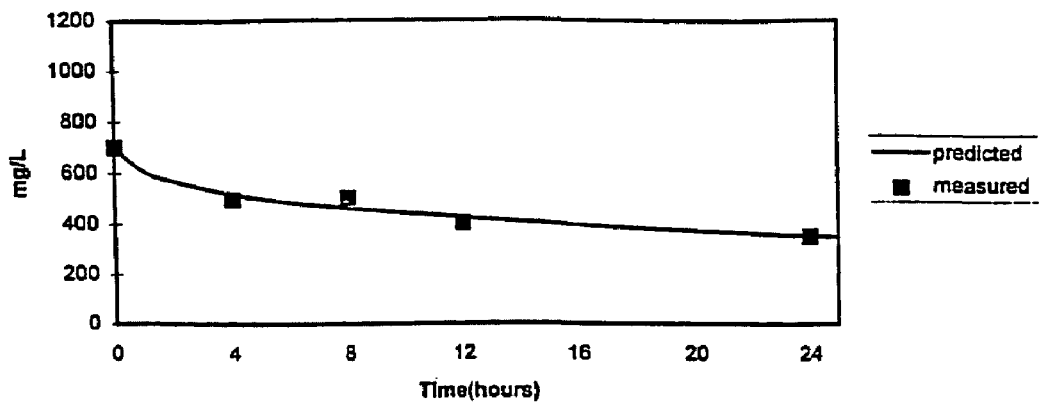
FIG. 3 shows nitrous acid remaining in different tss at 1000 mg/l nitrite addition.
Figure 3:
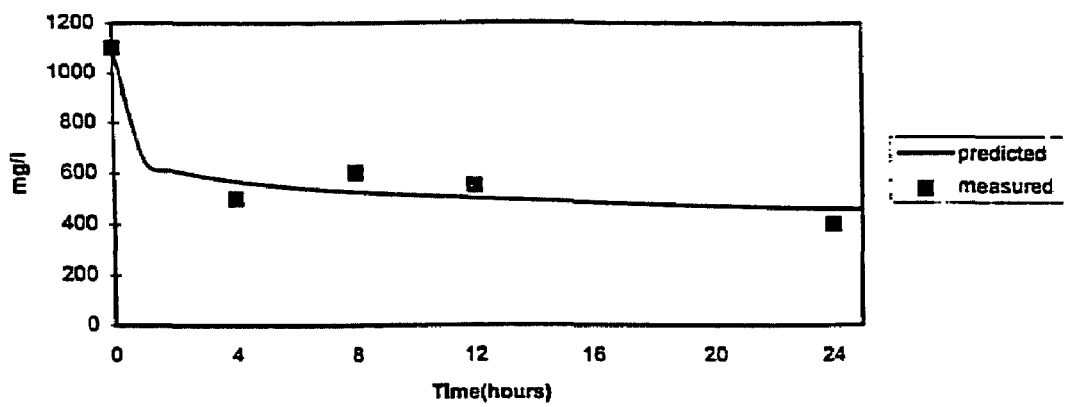
Figure 3:
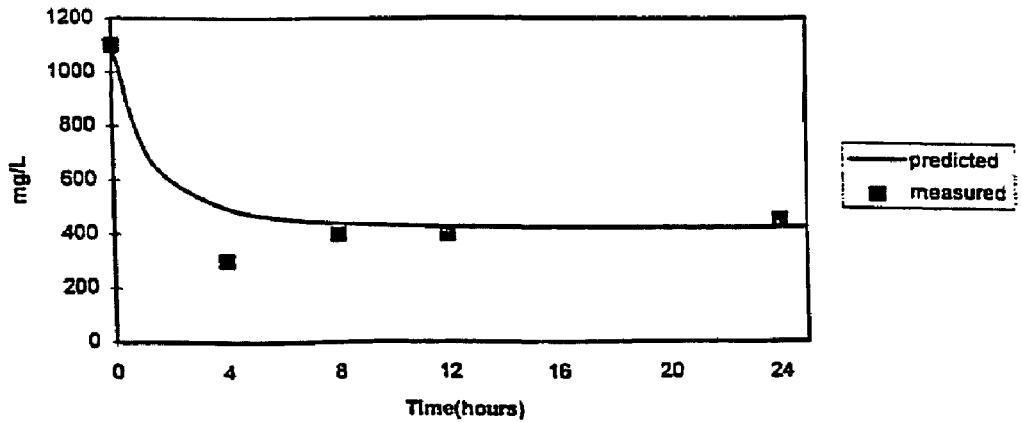
Figure 4:
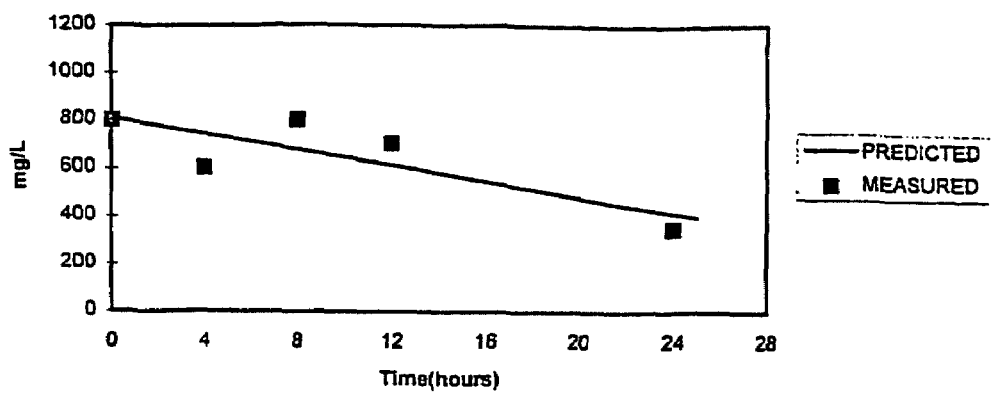
FIG. 4 shows nitrous acid remaining in different tss at 1500 mg/l nitrite addition.
Figure 4:
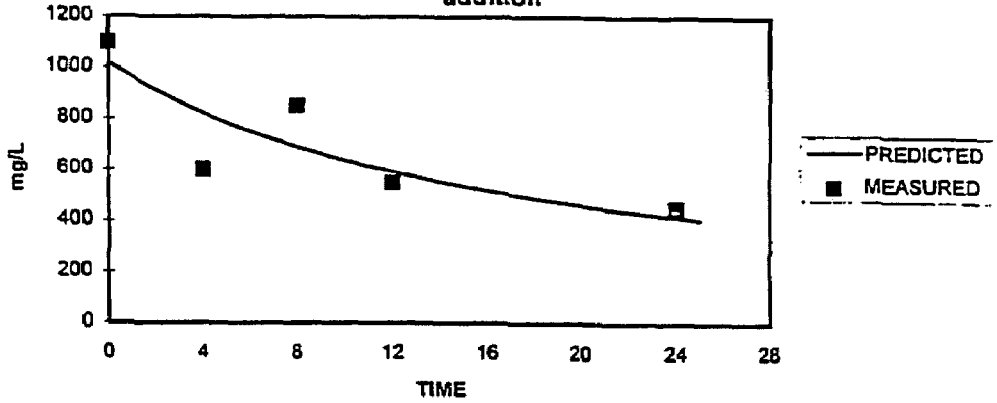
Figure 4:
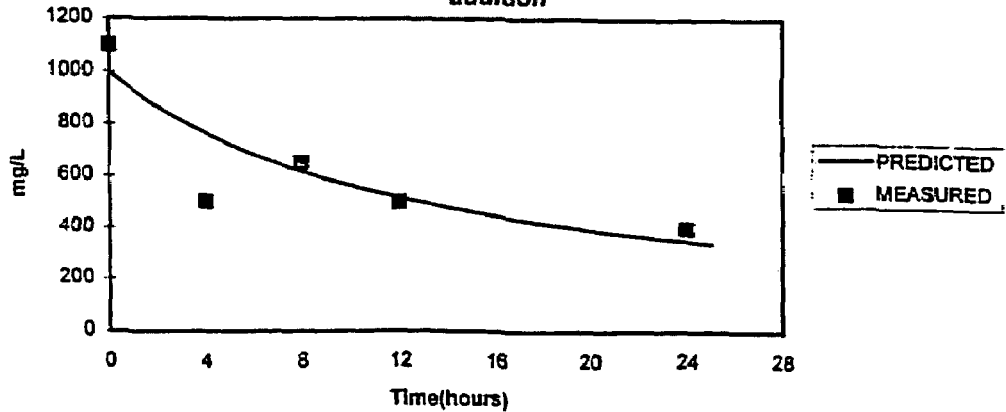

ORP and pH limitations are the most important factors which decide the success of nitrous disinfection. The reason for the strict condition is that the aqueous nitrous acid only exists in very small ORP range (FIG. 7) in the liquid system. The ORP-pH dominance diagram for nitrogen when $N_2$ is not redox active is composed of the lines given by the following functions: (FIG. 2)

N(III)/N(-III)  $NO_2^- + 7 H^+ + 6e^- = NH_3 + 2 H_2O$   log K = 81.5

$$pe = 13.58 + \frac{1}{6}\log\frac{\{NO_2^-\}}{\{NH_3\}} - \frac{7}{6}pH$$

$NO_3^-/N(III)$  $NO_3^- + 2 H^+ + 2e^- = NO_2^- + H_2O$   log K = 28.3

$$pe = 14.15 + \frac{1}{2}\log\frac{\{NO_3^-\}}{\{NO_2^-\}} - pH$$

Additional boundary lines are at pH=pK of $HNO_2^-$ (where pH=3.0) and pH=pK=9.3 (for $NH_3$–$NH_4$). For pH<3.0, $HNO_2$ will be predominant species for N(III) group, and for pH >3.0, $NO_2^-$ will be predominate species for N(III) group. For pH<9.3, the $NH_4^+$ will be predominant species for N(-III) group, and for pH>9.3, $NH_3$ will be predominant species for the N(-III) group.

This ORP-pH diagram is for nitrogen species when $N_2$ is not redox active. But for the real environment other factors such as ion strength and activity co-efficiency of the biosolid need to be considered.

ORP

The ORP data indicates that there is a stability range for the nitrous acid in municipal sewerage sludge. There are upper and lower limits which have not been determined, but the ranges where effective inactivation occurs have been observed. The importance of this observation is the need for the acid-oxidization step to raise the ORP to a range where the nitrite dosage will fall within an effective ORP range for inactivation. The formation of nitrogen species with respect to pH and ORP (ORP=–0.059 log[e-] (FIG. 7) illustrates this potential phenomenon with respect to pH and ORP. This figure describes the ORP-pH diagram for aqueous nitrogen at 25° C./1 atm when $N_2$ is not redox active. However, the activity corrections should be considered, and where necessary will provide a lower stability ORP-pH range for nitrous acid in the particular situation. In the laboratory study, the ORP of the aged sludge was in the range of 480 to 590 mv. In the field study, it was observed that, under a pH of 2.6, if ORP is greater than +520 mv, the inactivation of pathogens did not occur. The reason for this lower ORP stability range for the field studied is related to the high ionic strength of the biosolids (greater than 10 molar solution).

Henry's Law—$P_g = H \cdot X_g$
$P_g$=Partial pressure of gas in atm
H=Henry constant (increase with increase temperature)
$X_g$=equilibrium mole fraction of dissolved gas=Mole of gas (i.e. nitrous acid)
 a. Mole of air+Mole of gas (i.e.
 b. nitrous acid)

In our case, the existence of nitrous acid depends on a strict pH and ORP condition. Nitrous acid only exists in the system in a small amount. Besides, in the semi-closed static filled systems, the volatilization of nitrous acid is from 70–18%. That means that the non-charged gas form of nitrous acid volatilizes from the system before it can contact with *Ascaris* eggs. The partial pressure of nitrous acid is too small even if the initial nitrous acid dose is as high as 1500 mg/L. Therefore, the remaining nitrous acid is below 500 mg/L. This means that the dissolved nitrous acid gas will not volatilize in the closed system.

On the other hand, the partial gas pressure of nitrous acid is obviously higher than in the open system with a volatilization of 30–0%. Since there is less emission of nitrous acid gas, the dissolved nitrous gas increases to levels above 1500 mg/L. By obtaining these high levels of soluble nitrous acid, the PFRP disinfection can be obtained in two hours or less. Since the Henry constant will increase with rising temperature, it is acceptable that the combination of higher temperature, controlled pH and ORP will lead to a disinfection at lower exposure times.

Development of Acid Disinfection Process for Municipal Biosolids

The Synox Process was developed and given PFRP status (Table 10). In the early 1990's, operating conditions were recommended for the process as shown in the following.

| | Operating Parameters | Units |
|---|---|---|
| ORP | +300 to +500 | mv |
| pH | 2.5 to 3.1 | s.u. |
| Acidity | 50 to 100 | mg/L as $CaCO_3$ |
| Total Suspended Solid | 2 to 4 | % |
| Temperature | 10 to 40 | ° C. |
| Nitrous acid ($HNO_2$) | 1000 to 1500 | mg/L as $NO_2$ |

The revising of this process from the Synox process is the replacement of ozone with chlorite and hypochlorous acid (or chlorine dioxide). The ozone oxidant required 3 to 5 g/L and was very expensive. By utilization of chlorinated mixed oxidants, the ORP is controlled with much less oxidizing agents and cost than with the highly reactive ozone.

Tables 5 to 9 show the ORP level verses chlorinate mixed oxidants in open system and closed system.

TABLE 5

$NaHSO_4$ vs. ORP in the Open System*

| $NaHSO_4$ (mL) | ORP (mv) | pH |
|---|---|---|
| 9.0 | −66 | 3 |
| 10.1 | −43 | 2.7 |
| 10.7 | −24 | 2.5 |
| 11.2 | −17 | 2.3 |
| 11.4 | 15 | 2.04 |
| 12.7 | 27 | 2.00 |
| Addition of $NaClO_2$ + NaOCl (mL) | | |
| 0.5 + 0.5 | 378 | 2.00 |
| 1.0 + 1.0 | 405 | 2.09 |
| 1.5 + 1.5 | 445 | 2.11 |
| 2.0 + 2.0 | 461 | 2.13 |

*200 mL anaerobic sludge, initial pH = 7.91; both solution were added at same time

TABLE 6

$ClO_2$ vs. ORP in the Open System*

| $NaClO_2$ + NaOCl (mL) | ORP (mv) | pH |
|---|---|---|
| 0.0 + 0.0 | −34 | 2.70 |
| 0.5 + 0.5 | 356 | 2.77 |
| 1.0 + 1.0 | 352 | 2.82 |
| 1.5 + 1.5 | 356 | 2.86 |

*200 mL anaerobic sludge, initial pH = 2.7, both solutions were added at same time

TABLE 7

NaOCl vs ORP in the Open System*

| NaOCl (mL) | ORP (mv) | pH |
|---|---|---|
| 0 | 34 | 2.01 |
| 0.5 | 105 | 2.04 |
| 1.0 | 139 | 2.08 |
| 1.5 | 234 | 2.09 |
| Addition of $NaClO_2$ (mL) | | |
| 1.5 + 0.5 | 371 | 2.11 |
| 1.5 + 1.0 | 382 | 2.12 |
| 1.5 + 1.5 | 435 | 2.17 |

*200 mL anaerobic sludge, initial pH = 2.0, add NaOCl, then add $NaClO_2$; Temperature increased from 23° C. to 26.3° C.

TABLE 8

$NaClO_2$ vs. ORP in the Open System*

| $NaClO_2$ (mL) | ORP (mv) | pH |
|---|---|---|
| 0 | 45 | 2.01 |
| 0.5 | 386 | 2.04 |
| 1.0 | 435 | 2.05 |
| 1.5 | 438 | 2.03 |
| Addition of NaOCl (mL) | | |
| 1.5 + 0.5 | 475 | 2.03 |
| 1.5 + 1.0 | 491 | 2.00 |
| 1.5 + 1.5 | 507 | 2.00 |

*200 mL anaerobic sludge, initial pH = 2.01, add $NaClO_2$, and then NaOCl Temperature increased from 23° C. to 26.3° C.

TABLE 9

ORP vs Time Under the Closed System

| Anaerobic sludge | | | | Aerobic sludge | |
|---|---|---|---|---|---|
| pH = 2.7* | | pH = 2.0** | | pH = 2.7*** | |
| Time (min) | ORP (mv) | Time (min) | ORP (mv) | Time (min) | ORP (mv) |
| 0 | 493 | 0 | 393 | 0 | 466 |
| 15 | 526 | 15 | 396 | 20 | 461 |
| 30 | 535 | 30 | 402 | 30 | 461 |
| 40 | 547 | 45 | 403 | 70 | 463 |
| 60 | 569 | 540 | 361 | 100 | 463 |
| 70 | 572 | 570 | 353 | 160 | 465 |
| 90 | 584 | | | 340 | 467 |
| 120 | 587 | | | 460 | 470 |
| 145 | 590 | | | 885 | 475 |
| 185 | 591 | | | | |
| 245 | 588 | | | | |
| 365 | 573 | | | | |

*150 mL anaerobic sludge; 1.5 mL + 1.5 mL of $NaClO_2$ + NaOCl
**150 mL anaerobic sludges; 1 mL + 1 mL of $NaClO_2$ + NaOCl
***150 mL aerobic sludge; 1.5 mL + 1 mL of $NaClO_2$ + NaOCl In the late 1980's, Tulane researchers developed the Synox process, which utilized ozone, sulfuric acid and nitrous acid to disinfect biosolids. From this work, it was noted that nitrous acid was the primary disinfecting agent to inactivate bacteria, viruses and helminth. The process was observed to be effective and would produce a Class A biosolids within 4 to 24 h depending upon the dosage of nitrous acid in the range of 1500 to 400 mg/L, respectively. The Synox process was approved as a PFRP process by EPA's PEC in the early 1990's.

The problem with this process was related to the utilization of ozone to hold the ORP in the range of 300 to 600 mv. The ozone process was very costly and made the process not viable economically. The Modified Neutralizer Process is able to control the ORP under acidic conditions with chlorine dioxide, which is much less expensive and more reliable in a municipal sludge environment.

In this process, sodium nitrite under pH at 3 was used to disinfect aerobically or anaerobically digested municipal sludges. The acidic conditions were achieved by dosing sodium bisulfate solution into the sludges, while simultaneously dosing mixed oxidants (sodium hypochlorite, sodium chlorite and chlorine dioxide) to control ORP levels ranging from 300 to 600 mv. The chlorite-hypochlorite added to the acidified sludge provides in-situ generation of chlorine dioxide. Then, 1500 mg/L of nitrite in the form of sodium nitrite solution was added into the system. These were mixed together in a closed system. In this process, the municipal aerobically or anaerobically digested biosolids were spiked with pathogenic spikes and also monitored for indicator organisms, Aerobic endospores and Somatic bacteriophages. Among these tests, one duplicate and one control were conducted for QA/QC purposes. After the exposure periods, the treated sludges were collected in polyethylene bottles and neutralized using 6 N sodium hydroxide. The efficiency of disinfection was illustrated by percentage of viability of Ascaris eggs in the control and after the treatment. In addition, the controlled parameters were tested to establish a matrix of nitrous acid treatment for inactivating Ascaris eggs. The parameters include pH, temperature, ORP, contact time, solid content and pressure.

The stability of treating biosolids can be controlled by the pre-digestion processes, such as aerobic or anaerobic mesosphilic digestion. In the nitrous acid treatment, the oxidation step can enhance the stability of the resulting biosolids since the mixed oxidants should not lyses cells. Respirometer analysis was conducted to assess stabilization of the end product.

The ultimate goal is to produce a biosolid that meets Class A standards for disinfection and stability. The resulting biosolid may then be land applied or may have other uses as a fertilizer or soil amendment. If the process proves effective, it may also prove useful in the treatment of manure, waste material from agricultural applications, shipboard wastes such as grey and black water and medical waste materials.

What is claimed is:

1. A method of treating biosolids, comprising:
    adding chlorine dioxide to the biosolids;
    ceasing the addition of chlorine dioxide when the biosolids reaches an oxidation-reduction potential of from about +200 mv to about +600 mv;
    adjusting the pH of the biosolids; and
    producing and maintaining a non-charged state of a chemical species capable of penetrating the shell of Ascaris eggs,
    the method producing a reduction in vector attraction of the biosolids.

2. The method of claim 1 wherein the pH is adjusted using an acid.

3. The method of claim 2 wherein the pH is adjusted using an acid selected from the group consisting of sodium bisulfate, sulfuric acid, citric acid, phosphoric acid, hydrochloric acid and combinations thereof.

4. The method of claim 1 wherein the chemical species is nitrous acid.

5. The method of claim 4 comprising adding nitrous acid to the biosolids to reach a concentration of between about 300 ppm and about 3000 ppm, by weight.

6. The method of claim 4 wherein nitrous acid is formed by adding a species that dissociates to produce a nitrite radical.

7. The method of claim 4 wherein the pH of the sludge is lowered to less than 3.8.

8. The method of claim 1 wherein the pH is raised using a base.

9. The method of claim 7 wherein the base is selected from the group consisting of sodium hydroxide, ammonium hydroxide, and combinations and mixtures thereof.

10. The method of claim 7 wherein the non-charged chemical species is $_4$ $NH_3$.

11. The method of claim 1 further comprising generating chlorine dioxide by a method selected from the group consisting of adding pre-generated chlorine dioxide to the biosolids, adding of sodium chlorite to the acidified biosolids, adding sodium chlorate to the acidified biosolids, adding sodium hypochlorite to the acidified biosolids, and combinations thereof.

12. The method of claim 4 further comprising stabilizing the nitrous acid by elevating the ORP of the biosolids.

13. The method of claim 1 further comprising maintaining the biosolids in a closed system and preventing the of the non-charged species.

14. The method of claim 1 wherein the biosolids are either anaerobically or aerobically digested.

15. The method of claim 14 comprising anaerobically digesting the biosolids and lowering the pH of the biosolids.

16. The method of claim 14 wherein the biosolids are anaerobically digested and the non-charged chemical species is $H_2S$.

17. The method in claim 1 wherein the biosolids are of a percent solids ranging from 1 to 8% solids content, by weight.

* * * * *